H. CASLER.
BORING TOOL.
APPLICATION FILED FEB. 9, 1914.
1,204,339.
Patented Nov. 7, 1916.
2 SHEETS—SHEET 1.
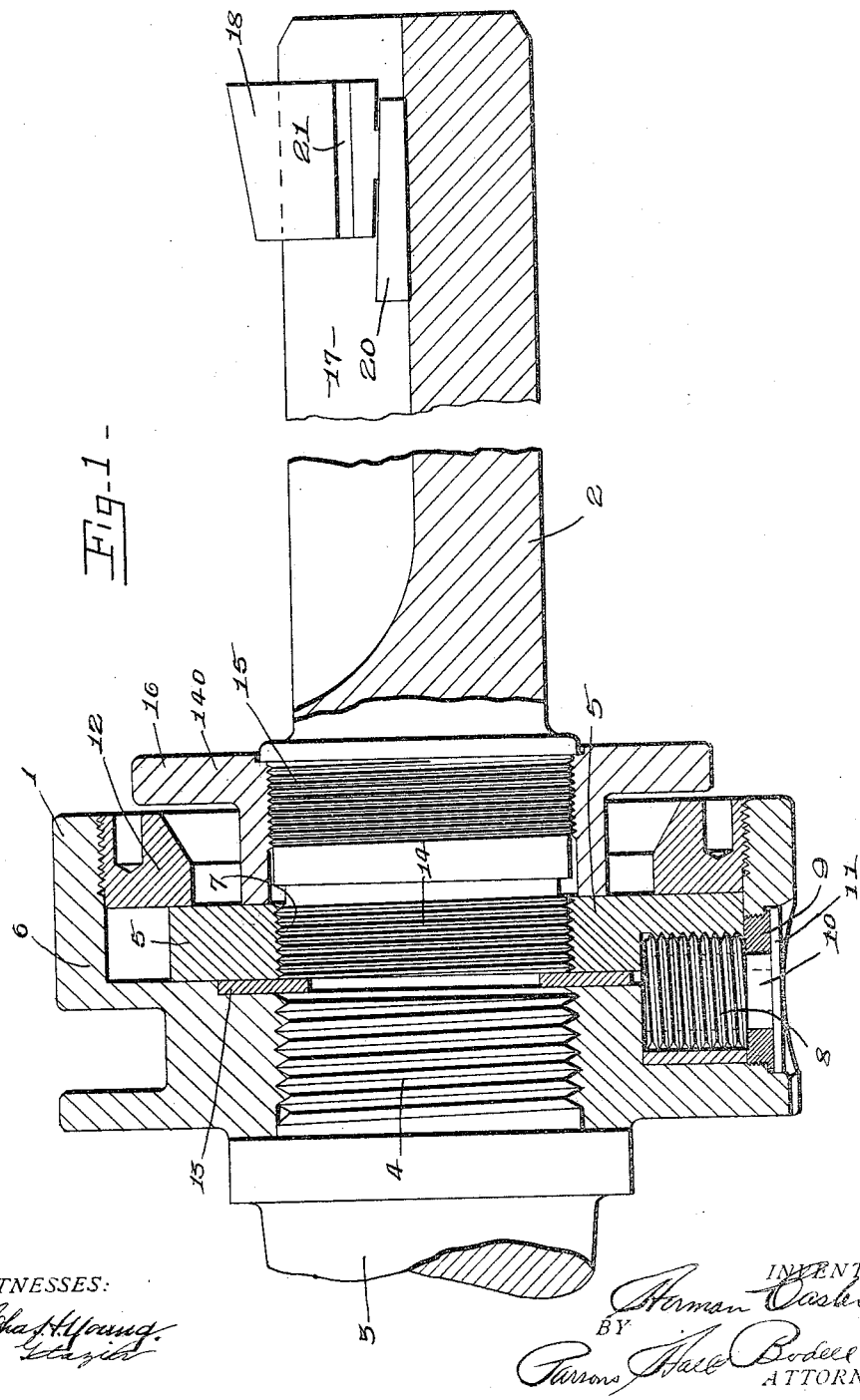

H. CASLER.
BORING TOOL.
APPLICATION FILED FEB. 9, 1914.
1,204,339.
Patented Nov. 7, 1916.
2 SHEETS—SHEET 2.
Fig-2-
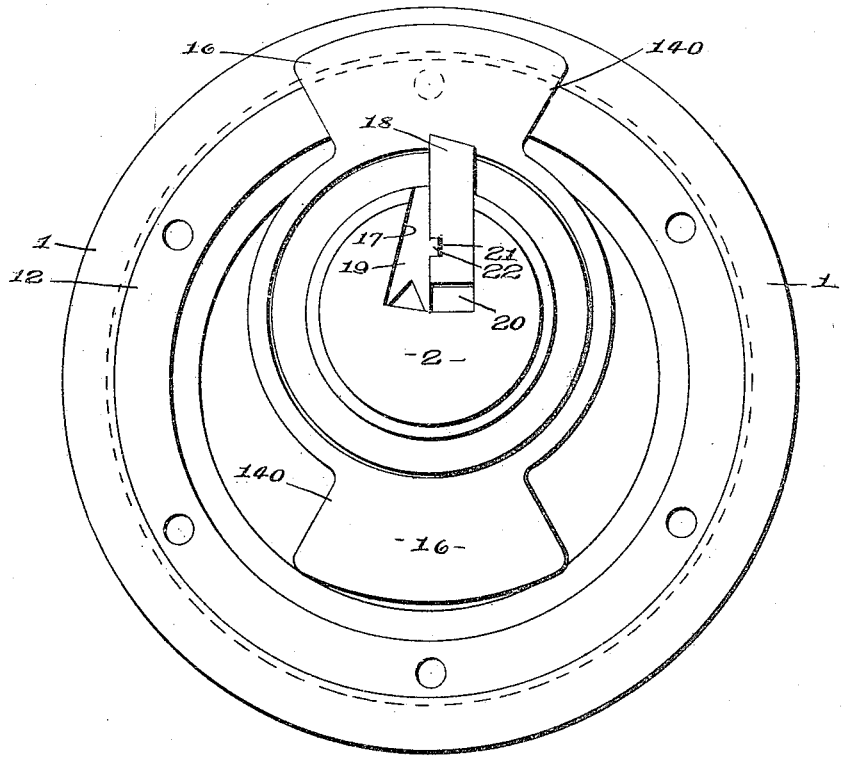
WITNESSES:
INVENTOR.
BY
ATTORNEYS.

UNITED STATES PATENT OFFICE.

HERMAN CASLER, OF CANASTOTA, NEW YORK.

BORING-TOOL.

1,204,339.  Specification of Letters Patent.  Patented Nov. 7, 1916.

Application filed February 9, 1914. Serial No. 817,461.

*To all whom it may concern:*

Be it known that I, HERMAN CASLER, a citizen of the United States, and a resident of Canastota, in the county of Madison and State of New York, have invented a certain new and useful Boring-Tool, of which the following is a specification.

This invention has for its object the production of a boring tool and particularly means whereby a long boring bar is rigidly secured to the boring head and also means for securing the cutter to the bar; and the invention consists in the novel features of construction hereinafter set forth and claimed.

In describing this invention, reference is had to the accompanying drawings, in which like characters designate corresponding parts in all the views.

Figure 1 is a longitudinal sectional view of this boring tool. Fig. 2 is an end elevation of parts seen in Fig. 1 looking to the left.

1 is the boring head, and 2 the bar, the head having means for securement to a machine tool spindle 3 or to a chuck on the spindle, and as here shown, the head 1 is formed with an axial threaded opening for receiving the threaded end 4 of the spindle, or chuck attached to the spindle. The head 1 also includes adjustable means by which the boring bar can be offset from the center more or less to set the cutter for large or small holes, said means being shown as a member adjustable crosswise of the center or axis of the head and formed with a threaded opening for receiving the threaded end of the bar. As here shown, said member is a slide 5 located in a recess formed by an annular flange 6 projecting from the front side of the head 1, the slide being movable crosswise of the center of the head in order to carry its threaded opening 7 more or less off the axis of the head. The slide is adjusted by means of a screw 8 extending radially in the head from the periphery thereof and coacting with threads provided on the slide 5, the screw being located in a socket and held from endwise movement therein by the bottom of the socket and by a plug 9 threading in the outer portion in which the screw is located.

The screw 8 is provided with a shank 10 which extends through the nut 9 and with a head 11 at the outer end of the shank by means of which the screw is turned by a suitable tool. The slide 5 is held in its adjusted position by an annular ring 12 which threads into the flange 6 against the slide 5.

The head is also provided with an annular abutment ring 13 interposed between the slide 5 and the bottom of the recess formed with the annular flange 6, this ring preferably extending or overlapping the end of the spindle 4 and forming an abutment for the bar 2. The bar 2 has one end threaded at 14 for turning into the threaded opening 7 of the slide 5 and is held from turning by a nut 140 turning on the threaded portion 15 at the base of the bar 2, the threads being located in front of the threads 14 and being of different size or pitch from the threads 14. The locking nut 140 threads against the head and particularly against the slide 5 of the head and thus firmly locks the bar from movement. The nut 140 is usually provided with wings 16 by means of which it is turned.

The bar 2 is formed with a lengthwise groove 17 opening through its outer end and in which is located the cutter 18 and the means for holding the cutter in position, the cutter and its holding means being adjustable along the groove. The groove is formed with an undercut side and preferably with both sides undercut. The cutter and its fastening means dovetail into the groove and the fastening means consist of a wedge 19 slidable between the cutter and one of the undercut sides of the groove, (the cutter being of less width than the groove) and a wedge 20 slidable along the bottom of the groove under the inner edge of the cutter. The wedge 19 is provided with means for holding the cutter elevated off the bottom of the groove and uniting the cutter and the wedge 19 so that they are both carried or wedged upwardly or outwardly by the wedge 20 engaging the lower edge of the cutter 18. As here shown, the cutter 18 and wedge 19 are formed with an interfitting mortise and tenon 21, 22 extending lengthwise thereof.

In operation, the cutter 18 and wedge 19 are first placed into the groove together through the open end of the groove, and the wedge 20 then placed in position forcing the cutter 18 and wedge 19 upwardly together and firmly forcing the same against the undercut sides of the groove so that the cutter is absolutely rigid.

This boring tool is particularly advantageous in that the bar 2 is firmly rooted to the head owing to the arrangement of the nut 140 so that a particularly long bar 2 can be used for cutting out deep holes; and further in that the cutter is firmly and yet adjustably secured to the boring bar.

What I claim is:

1. A boring tool comprising a head having a member adjustable crosswise thereof, means for holding said member in its adjusted position, a boring bar having one end supported by said member and provided with threads thereon, and a nut turning on said threads against said member, substantially as and for the purpose set forth.

2. A boring tool comprising a head having a member adjustable crosswise of the axis thereof, means for holding said member in its adjusted position, the adjustable member being formed with a threaded opening, a boring bar having one end threaded and turning in the threaded opening of the member, the bar being also formed with additional threads near said end, and a nut turning on the last mentioned threads against the member, substantially as and for the purpose specified.

3. A boring tool comprising a head having a member adjustable crosswise of the axis of the head, means for holding said member in its adjusted position, a boring bar connected to the head and having threads thereon, and a nut turning on the boring bar against said means, substantially as and for the purpose set forth.

4. A boring tool comprising a head for attachment to a spindle, the head being formed with a recess, a slide located at the bottom of the recess and adjustable crosswise of the axis of the head, means for adjusting the slide, an internal nut threading into the recess against the slide, a boring bar threading in the slide, and a nut threading on the boring bar and bearing against the slide, substantially as and for the purpose described.

In testimony whereof, I have hereunto signed my name in the presence of two attesting witnesses, at Canastota, in the county of Madison, in the State of New York, this 24 day of January, 1914.

HERMAN CASLER.

Witnesses:
GERTRUDE E. WATSON,
HARRY HULL.

Copies of this patent may be obtained for five cents each, by addressing the "Commissioner of Patents, Washington, D. C."